United States Patent
Cho et al.

(10) Patent No.: US 11,349,514 B2
(45) Date of Patent: May 31, 2022

(54) RADIO FREQUENCY TRANSMITTER CAPABLE OF SELECTING OUTPUT POWER CONTROL RANGE AND WIRELESS COMMUNICATION DEVICE INCLUDING THE SAME

(71) Applicant: Samsung Electronics Co., Ltd., Suwon-si (KR)

(72) Inventors: Youngsea Cho, Seongnam-si (KR); Jiseon Paek, Suwon-si (KR); Wan Kim, Uiwang-si (KR); Daechul Jeong, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/215,503

(22) Filed: Mar. 29, 2021

(65) Prior Publication Data

US 2021/0367630 A1    Nov. 25, 2021

(30) Foreign Application Priority Data

May 25, 2020    (KR) .................. 10-2020-0062579

(51) Int. Cl.
*H04L 5/12*    (2006.01)
*H04L 23/02*    (2006.01)
*H04B 1/04*    (2006.01)
*H04B 1/00*    (2006.01)

(52) U.S. Cl.
CPC ......... *H04B 1/0483* (2013.01); *H04B 1/0007* (2013.01); *H04B 1/0078* (2013.01)

(58) Field of Classification Search
CPC ... H04B 1/0483; H04B 1/0007; H04B 1/0078

USPC ........................................................ 375/262
See application file for complete search history.

(56) References Cited

U.S. PATENT DOCUMENTS

| 5,889,486 A | 3/1999 | Opris et al. |
|---|---|---|
| 8,964,881 B2 | 2/2015 | Goswami |
| 9,197,241 B2 | 11/2015 | Liu |
| 9,520,906 B2 * | 12/2016 | Butterfield ............... H03F 3/21 |
| 9,531,409 B2 | 12/2016 | Butterfield et al. |
| 9,634,696 B2 | 4/2017 | Lee et al. |
| 10,389,316 B1 | 8/2019 | Silva-Martinez et al. |
| 10,396,815 B1 * | 8/2019 | Kuttner ................. H03F 3/2175 |

(Continued)

FOREIGN PATENT DOCUMENTS

| KR | 10-1603892 B1 | 3/2016 |
|---|---|---|
| KR | 10-1681942 B1 | 12/2016 |

OTHER PUBLICATIONS

Wen Yuan, Jeffrey Walling, A Switched-Capacitor Controlled Digital-Current Modulated Class-E Transmitter, IEEE, p. 1-10 (Year: 2017).*

(Continued)

*Primary Examiner* — Tanmay K Shah
(74) *Attorney, Agent, or Firm* — Harness, Dickey & Pierce, P.L.C.

(57) ABSTRACT

A radio frequency (RF) transmitter including a switched-capacitor digital-to-analog converter (SC-DAC) configured to selectively generate a first RF output signal having a first output power control range or a second RF output signal having a second output power control range from input signals received through a plurality of lines may be provided.

20 Claims, 14 Drawing Sheets

(56) References Cited

U.S. PATENT DOCUMENTS

| | | | |
|---|---|---|---|
| 2011/0001492 A1* | 1/2011 | Nys | H03M 1/123 |
| | | | 324/658 |
| 2016/0248437 A1* | 8/2016 | Zhang | H03M 1/442 |
| 2016/0285470 A1* | 9/2016 | Leuschner | H03M 1/66 |
| 2019/0288653 A1* | 9/2019 | Yoo | H04B 1/04 |

OTHER PUBLICATIONS

Dries Vercaemer, Johan Raman, Pieter Rombouts, Low-Pass Filtering SC-DAC for Reduced Jitter and Slewing Requirements on CTSDMs, IEEE Transactions on circuits and systems—I; Regular papers, vol. 66, No. 4, Apr. 2019 (Year: 2019).*

P. Madoglio et al. "A 2.4GHz WLAN Digital Polar Transmitter with Synthesized Digital-to-Time Converter in 14nm Trigate/FinFET Technology for IoT and Wearable" ISSCC, Session 13, published 2017.

M. Fulde et al. "13.2 A digital multimode polar transmitter supporting 40MHz LTE Carrier Aggregation in 28nm CMOS" ISSCC, session 13, published 2017.

* cited by examiner

RADIO FREQUENCY TRANSMITTER CAPABLE OF SELECTING OUTPUT POWER CONTROL RANGE AND WIRELESS COMMUNICATION DEVICE INCLUDING THE SAME

CROSS-REFERENCE TO RELATED APPLICATION

This application claims priority under 35 U.S.C. § 119 to Korean Patent Application No. 10-2020-0062579, filed on May 25, 2020, in the Korean Intellectual Property Office, the disclosure of which is incorporated herein in its entirety by reference.

BACKGROUND

The inventive concepts relate to radio frequency (RF) transmitters for outputting an RF analog signal and/or wireless communication devices including the same.

With the recent advancement of communication technology, various communication services including an Internet of things (IoT), as well as a cellular communication service, have been developed. Although a necessity of coexistence of different communication systems has increased as described above, an available frequency band is limited. In addition, to minimize degradation in mutual wireless communications, which may occur when wireless communication devices included different systems simultaneously operate, it is increasingly important to control power of an output signal of each wireless communication device.

Digital-circuit-based RF transmitters maximize the efficiency of systems using a switching amplifier such as Class D having no constant bias current consumption, but need to control the dynamic range of output power (or transmission power) using the resolution of a digital-to-analog converter (DAC) to control the output power. For example, in the case of a digital RF transmitter having a maximum output power of 13 dBm, at least 21 bits of resolution of a DAC is required to satisfy an error vector magnitude requirement and to control output power of about 80 dBm. This exponentially increases the number of circuits to allow the output power to be controlled using the resolution of a DAC, thereby increasing the area of the digital RF transmitter and the power consumption thereof for switching. Accordingly, it is very difficult to design a DAC having a matching degree of at least 21 bits.

SUMMARY

The inventive concepts provide radio frequency (RF) transmitters including a structure for selecting an output power control range according to a communication status and/or wireless communication devices including the RF transmitter.

According to an aspect of the inventive concepts, an RF transmitter may include a switched-capacitor digital-to-analog converter (SC-DAC) configured to selectively generate one of a first RF output signal and a second RF output signal from input signals received through a plurality of lines, the first RF output signal having a first output power control range and the second RF output signal having a second output power control range, and an output terminal configured to output one of the first RF output signal and the second RF output signal. The SC-DAC may include a first capacitor row having an output end connected to the output terminal, the first capacitor row configured to generate the first RF output signal; a power attenuation capacitor having an end connected to the output terminal; a first switch element; and a second capacitor row having an output end selectively connected to an opposite end of the power attenuation capacitor through the first switch element, the second capacitor row configured to generate the second RF output signal.

According to another aspect of the inventive concepts, a wireless communication device may include a modem configured to output digital signals by modulating digital data, and a RF transmitter configured to selectively generate, from a plurality of input signals corresponding to the digital signals and output one of a first RF output signal and a second RF output signal based on a communication status, the first RF output signal having a first output power control range and the second RF output signal having a second output power control range. The RF transmitter may include a high-power SC-DAC circuit including a first capacitor row configured to generate the first RF output signal having the first output power control range when receiving the plurality of input signals; and a low-power SC-DAC circuit including a second capacitor row configured to generate the second RF output signal having the second output power control range when receiving some of the plurality of input signals.

According to a further aspect of the inventive concepts, a RF transmitter may include a high-power SC-DAC circuit including a first capacitor row including "n" capacitors, the first capacitor row configured to receive "n" input signals through "n" lines and generate a first RF output signal from the "n" input signals, the first RF output signal having a first output power control range, where "n" is an integer of at least 1, a low-power SC-DAC circuit including a second capacitor row and a power attenuation capacitor, the second capacitor row including "m" capacitors and being configured to receive "m" input signals through "m" lines and generate a second RF output signal from the "m" input signals, the second RF output signal having a second output power control range, and the power attenuation capacitor being configured to be selectively connected to an output end of the second capacitor row, where "m" is an integer that is greater than or equal to 1 and less than "n", and a switch circuit configured to selectively input the "n" input signals to the high-power SC-DAC circuit or the "m" input signals to the low-power SC-DAC circuit based on a control signal corresponding to a communication status.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, example embodiments will be described in detail with reference to the accompanying drawings.

Figure 1:
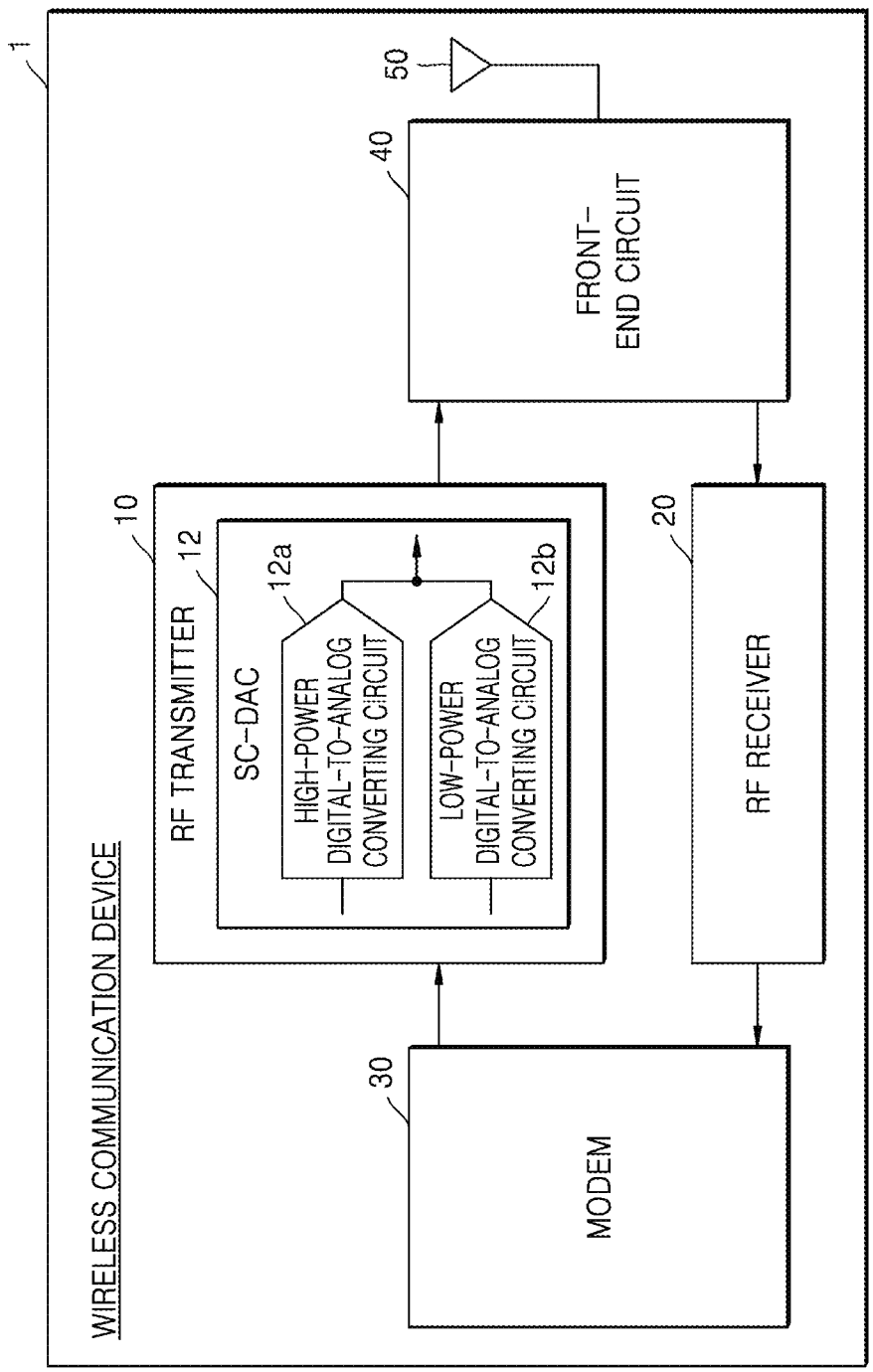
FIG. 1 is a schematic block diagram of a wireless communication device according to an example embodiment.

FIG. 1 is a schematic block diagram of a wireless communication device 1 according to an example embodiment.

Referring to FIG. 1, the wireless communication device 1 may include a radio frequency (RF) transmitter 10, an RF receiver 20, a modem 30, a front-end circuit 40, and an antenna 50. The modem 30 may generate digital signals by modulating digital data for transmission of information (e.g., digital information) and provide the digital signals to the RF transmitter 10. For example, the digital signals may include in-phase (I) data and quadrature (Q) data. Further, the modem 30 may reconstruct original digital data by demodulating digital signals received from the RF receiver 20.

The RF transmitter 10 may include a switched-capacitor digital-to-analog converter (SC-DAC) 12. The SC-DAC 12 may generate an RF output signal in an RF band from digital signals in a baseband that are received from the modem 30, and provide the RF output signal to the front-end circuit 40.

In an example embodiment, the SC-DAC 12 may include a high-power digital-to-analog converting (DAC) circuit 12*a* and a low-power DAC circuit 12*b*. The high-power DAC circuit 12*a* and the low-power DAC circuit 12*b* may perform SC-based digital-to-analog conversion and each may include a plurality of switching amplifiers and a plurality of capacitors.

According to an example embodiment, the SC-DAC 12 may select a high power output mode or a low power output mode based on a communication status between the wireless communication device 1 and a base station (or another wireless communication device), and may operate based on a selected output mode. The communication status may be a concept indicating the quality of channels formed between the wireless communication device 1 and a base station (or another wireless communication device). When the communication status is good, the wireless communication device 1 may transmit an RF analog signal to a base station (or another wireless communication device) with relatively low power. When the communication status is poor, the wireless communication device 1 may transmit an RF analog signal to a base station (or another wireless communication device) with relatively high power.

The modem 30 may measure at least one selected from reference signal received power (RSRP), a reference signal received quality (RSRQ), a received signal strength indicator (RSSI), and a signal-to-interference noise ratio (SINR) of a signal received from a base station (or another wireless communication device) to identify the communication status.

The modem 30 may generate a control signal based on the communication status and provide the control signal to the SC-DAC 12, and the high-power DAC circuit 12*a* or the low-power DAC circuit 12*b* may perform digital-to-analog conversion on digital signals received from the modem 30 in response to the control signal.

According to an example embodiment, the high-power DAC circuit 12*a* may generate a first RF output signal having a first output power control range by performing digital-to-analog conversion on the digital signals, and the low-power DAC circuit 12*b* may generate a second RF output signal having a second output power control range by performing digital-to-analog conversion on the digital signals. The first output power control range may cover higher output power than the second output power control range. For example, the high-power DAC circuit 12*a* may generate the first RF output signal having power in the first output power control range when the communication status is less than a reference value and thus poor, and the low-power DAC circuit 12*b* may generate the second RF output signal having power in the second output power control range when the communication status is greater than or equal to the reference value and thus good.

The first output power control range supported by the high-power DAC circuit 12*a* may partially overlap the second output power control range supported by the low-power DAC circuit 12*b*. In some embodiments, the first output power control range may not overlap the second output power control range. Specific example implementations of the high-power DAC circuit 12*a* and the low-power DAC circuit 12*b* will be described below.

The front-end circuit 40 may perform certain conversion on an RF output signal and an inverted RF output signal, which are received from the RF transmitter 10, generate an RF analog signal having a frequency component in a target band using a balun, and transmit the RF analog signal to a base station (or another wireless communication device) through the antenna 50.

The antenna 50 may receive and transmit an RF analog signal, which is generated according to an example embodiment, to the front-end circuit 40, and the front-end circuit 40 may low-noise amplify the RF analog signal and provide an amplified RF analog signal to the RF receiver 20. The RF receiver 20 may convert the amplified RF analog signal into baseband digital signals and provide the digital signals to the modem 30.

According to an example embodiment, the RF transmitter 10 may select an output power control range corresponding to the communication status between the wireless communication device 1 and a base station (or another wireless communication device) and control output power based on the selected output power control range, thereby reducing or minimizing the layout area and/or power consumption of the RF transmitter 10 and outputting an RF output signal having a high dynamic range.

Figure 2:
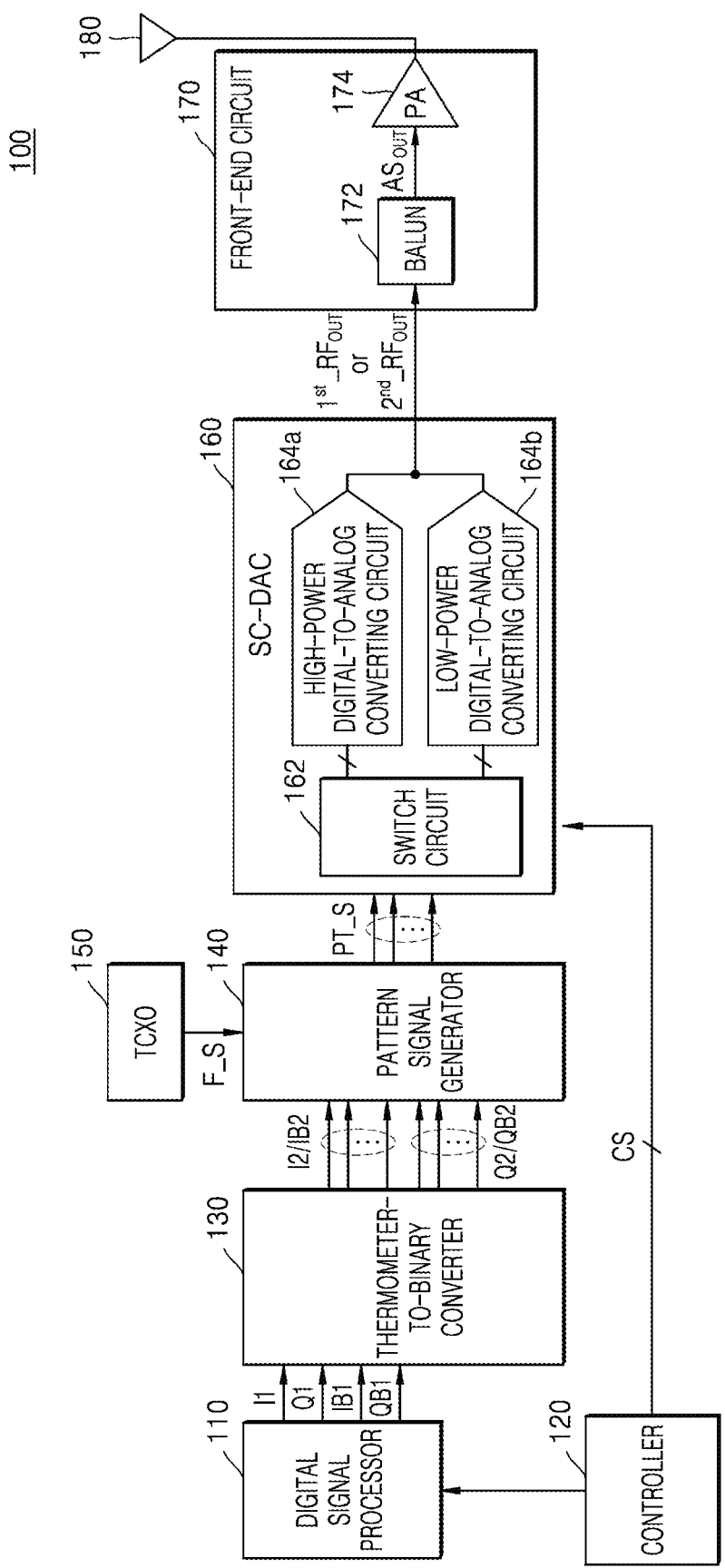
FIG. 2 is a block diagram of a wireless communication device according to an example embodiment.

FIG. 2 is a block diagram of a wireless communication device 100 according to an example embodiment. Although descriptions with reference to FIG. 2 are focused on the wireless communication device 100, which includes an RF transmitter using an IQ cell sharing technique, to explain a signal input to an SC-DAC 160, example embodiments are not limited thereto. According to some example embodiments, the wireless communication device 100 may include a quadrature transmitter, a polar transmitter, or the like.

Referring to FIG. 2, the wireless communication device 100 may include a digital signal processor 110, a controller 120, a thermometer-to-binary converter 130, a pattern signal generator 140, a crystal oscillator 150, the SC-DAC 160, a front-end circuit 170, and an antenna 180.

The digital signal processor 110 and the controller 120 may form the modem 30 in FIG. 1. The thermometer-to-binary converter 130, the pattern signal generator 140, the crystal oscillator 150, and the SC-DAC 160 may form the RF transmitter 10 in FIG. 1.

The controller 120 may control the operations of the digital signal processor 110 and circuit blocks of the wireless communication device 100. The controller 120 may identify the communication status between the wireless communication device 100 and a base station, select an output mode based on the communication status, and generate and provide a control signal CS for controlling the operation of the output mode to the SC-DAC 160.

The digital signal processor 110 may output I data I1, Q data Q1, inverted I data IB 1, and inverted Q data QB 1, each having "k" bits (where "k" is an integer of at least 2), to the thermometer-to-binary converter 130. The thermometer-to-binary converter 130 may perform thermometer-to-binary conversion on the I data I1, the Q data Ql, the inverted I data IB1, and the inverted Q data QB1 and provide I binary data 12, Q binary data Q2, inverted I binary data IB2, and inverted Q binary data QB2 to the pattern signal generator 140.

The pattern signal generator 140 may generate pattern signals PT_S, which have a certain pattern corresponding to a pattern of an I-Q binary data pair and a pattern of an inverted I-Q binary data pair, using a frequency signal F_S received from the crystal oscillator 150 and provide the pattern signals PT_S to the SC-DAC 160.

The pattern signal generator 140 may provide in parallel as many pattern signals PT_S as the number of bits in the I binary data 12, the Q binary data Q2, the inverted I binary data IB2, and the inverted Q binary data QB2 to the SC-DAC 160.

In an example embodiment, the pattern signal generator 140 may generate a clock signal by dividing the frequency signal F_S to a certain frequency and generate a plurality of clock signals, which have a certain phase difference from each other, from the clock signal. The pattern signal generator 140 may generate the pattern signals PT_S using the clock signals.

The SC-DAC 160 may include a switch circuit 162, a high-power DAC circuit 164a, and a low-power DAC circuit 164b. The switch circuit 162 may selectively provide the pattern signals PT_S to one of the high-power DAC circuit 164a and the low-power DAC circuit 164b in response to the control signal CS received from the controller 120. For example, when the SC-DAC 160 operates in the high power output mode, the switch circuit 162 may provide the pattern signals PT_S to the high-power DAC circuit 164a through a plurality of lines. When the SC-DAC 160 operates in the low power output mode, the switch circuit 162 may provide some of the pattern signals PT_S to the low-power DAC circuit 164b through some of the lines. In some example embodiments, the low-power DAC circuit 164b may be deactivated in the high power output mode, and the high-power DAC circuit 164a may be deactivated in the low power output mode.

The high-power DAC circuit 164a may generate a first RF output signal $1^{st}\_RF_{OUT}$ having a first output power control range by performing SC-based digital-to-analog conversion using the pattern signals PT_S. The low-power DAC circuit 164b may generate a second RF output signal $2^{nd}\_RF_{OUT}$ having a second output power control range by performing SC-based digital-to-analog conversion using some of the pattern signals PT_S.

In an example embodiment, the high-power DAC circuit 164a may include a first capacitor row to receive the pattern signals PT_S and generate the first RF output signal $1^{st}\_RF_{OUT}$ having a first resolution, and the low-power DAC circuit 164b may include a second capacitor row to receive some of the pattern signals PT_S and generate the second RF output signal $2^{nd}\_RF_{OUT}$ having a second resolution. In an example embodiment, when the high-power DAC circuit 164a generates the first RF output signal $1^{st}\_RF_{OUT}$, the low-power DAC circuit 164b may be implemented such that the second capacitor row does not influence the first RF output signal $1^{st}\_RF_{OUT}$. When the low-power DAC circuit 164b generates the second RF output signal $2^{nd}\_{OUT}$, the high-power DAC circuit 164a may be implemented such that the first capacitor row may contribute to the power attenuation of the second RF output signal $2^{nd}\_{OUT}$.

In an example embodiment, the low-power DAC circuit 164b may also include a power attenuation capacitor selectively connected in series to the second capacitor row so that the second output power control range may cover lower output power than the first output power control range of the high-power DAC circuit 164a. Moreover, the low-power DAC circuit 164b may further include a third capacitor row selectively connected in series between the second capacitor row and the power attenuation capacitor and thus variously adjust the second output power control range.

The front-end circuit 170 may include a balun_172 and a power amplifier (PA) 174. The balun 172 may receive the first or second RF output signal $1^{st}\_RF_{OUT}$ or $2^{nd}\_{OUT}$, perform a certain conversion operation thereon, and generate an RF analog signal $AS_{OUT}$. The power amplifier 174 may amplify and transmit the RF analog signal $AS_{OUT}$ to a base station (or another wireless communication device) through the antenna 180.

The wireless communication device 100 of FIG. 2 is an example implementation, and example embodiments are not limited thereto. For example, the SC-DAC 160 may further include a high-power DAC circuit, which generates an inverted first RF output signal, and a low-power DAC circuit, which generates an inverted second RF output signal. The pattern signals PT_S input to the SC-DAC 160 may be referred to as input signals, and the thermometer-to-binary converter 130 and the pattern signal generator 140 may be replaced with a different configuration for generating input signals provided to the SC-DAC 160. Because the kind of signals provided to the SC-DAC 160 may vary with RF transmitters according to example embodiments, signals input to the SC-DAC 160 are hereinbelow defined and described as input signals and thus prevented from being limited to the pattern signals PT_S in FIG. 2.

Figure 3A:
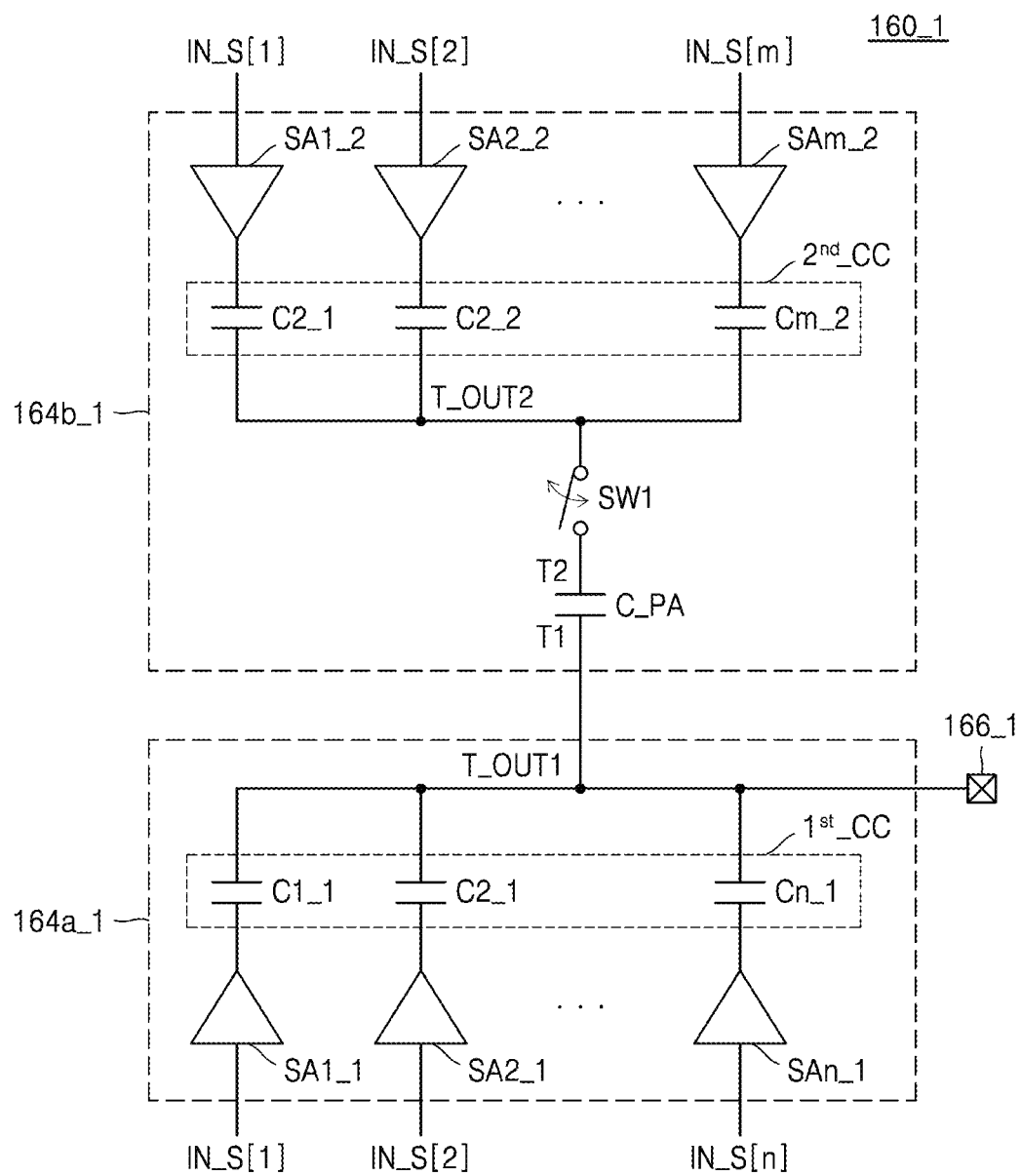
FIGS. 3A and 3B are circuit diagrams of switched-capacitor digital-to-analog converters (SC-DACs) according to some example embodiments.
Figure 3B:
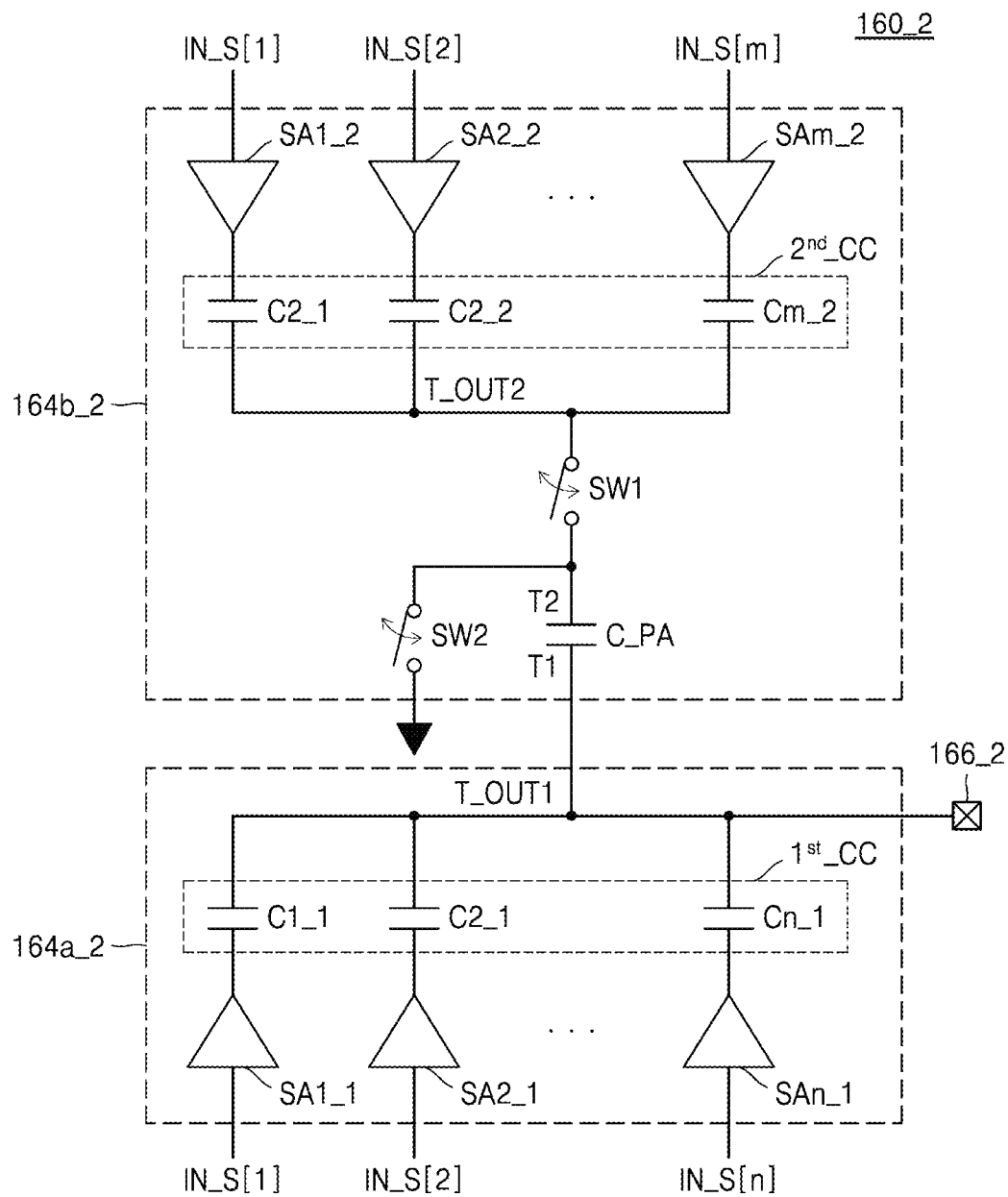

FIGS. 3A and 3B are circuit diagrams of SC-DACs 160_1 and 160_2 according to some example embodiments.

Referring to FIG. 3A, the SC-DAC 160_1 may include a high-power DAC circuit 164a_1, a low-power DAC circuit 164b_1, and an output terminal 166_1. The high-power DAC circuit 164a_1 may include first through n-th switching amplifiers SA1_1 through SAn_1 (where "n" is an integer of at least 1) and a first capacitor row $1^{st}\_CC$. The low-power DAC circuit 164b_1 may include first through m-th switching amplifiers SA1_2 through SAm_2 (where "m" is an integer of at least 1), a second capacitor row $2^{nd}\_CC$, a first switch element SW1, and a power attenuation capacitor C_PA. In some example embodiments, a switching amplifier may be implemented by an inverter, which includes an N-channel metal-oxide semiconductor (NMOS) transistor and a P-channel MOS (PMOS) transistor. Furthermore, the switch amplifier may be implemented in various forms such as Class D, Class E, or Class G.

In an example embodiment, the low-power DAC circuit 164b_1 may include fewer switching amplifiers and capacitors than the high-power DAC circuit 164a_1. The high-power DAC circuit 164a_1 may receive a plurality of input signals, e.g., first through n-th input signals IN_S[1] through IN_S[n] in the high power output mode. The low-power DAC circuit 164b_1 may receive only some input signals, e.g., the first through m-th input signals IN_S[1] through IN_S[m], among the first through n-th input signals IN_S[1] through IN_S[n] in the low power output mode. This is because even though the low-power DAC circuit 164b_1 operating in a relatively good communication status receives only some input signals and generates a second RF output signal, a base station (or another wireless communication device) receiving the second RF output signal may demodulate the second RF output signal with a high probability of success.

The first capacitor row $1^{st}\_CC$ may include first through n-th capacitors C1_1 through Cn_1 connected in parallel to each other. An output end T_OUT1 of the first capacitor row $1^{st}\_CC$ may be connected to the output terminal 166_1. The first capacitor C1_1 may be connected in series to the first switching amplifier SA1_1, and the first switching amplifier SA1_1 may amplify and provide the first input signal IN_S[1] to the first capacitor C1_1 in the high power output mode. In the low power output mode, an input end of the first switching amplifier SA1_1 may be connected to a certain supply voltage or the ground. The above-described example implementations of the first capacitor C1_1 and the first switching amplifier SA1_1 may also be applied to the other capacitors (e.g., the second through n-th capacitors C2_1 through Cn_1) and the other switching amplifiers (e.g., the second through n-th switching amplifiers SA2_1 through SAn_1). Thus, detailed descriptions thereof will be omitted.

The second capacitor row $2^{nd}\_CC$ may include first through m-th capacitors C1_2 through Cm_2 connected in parallel to each other. The first capacitor C1_2 may be connected in series to the first switching amplifier SA1_2, and the first switching amplifier SA1_2 may amplify and provide the first input signal IN_S[1] to the first capacitor C1_2 in the low power output mode. In the high power output mode, an input end of the first switching amplifier SA1_2 may be connected to a certain supply voltage or the ground. The above-described example implementations of the first capacitor C1_2 and the first switching amplifier SA1_2 may also be applied to the other capacitors (e.g., the second through m-th capacitors C2_2 through Cm_2), and the other switching amplifiers (e.g., the second through m-th switching amplifiers SA2_2 through SAm_2). Thus, detailed descriptions thereof will be omitted.

In an example embodiment, an end T1 of the power attenuation capacitor C_PA may be connected to the output end T_OUT1 of the first capacitor row $1^{st}\_CC$, and an opposite end T2 of the power attenuation capacitor C_PA may be selectively connected to an output end T_OUT2 of the second capacitor row $2^{nd}\_CC$ through the first switch element SW1.

In the high power output mode, the first switch element SWI is turned off and the output end T_OUT2 of the second capacitor row $2^{nd}\_CC$ is disconnected from the output terminal 166_1, and accordingly the high-power DAC circuit 164a_1 may generate a first RF output signal having a first output power control range.

In the low power output mode, the first switch element SWI is turned on so that the second capacitor row $2^{nd}\_CC$ may be connected in series to the power attenuation capacitor C_PA, and accordingly the low-power DAC circuit 164b_1 may be power-attenuated by the power attenuation capacitor C_PA and may generate a second RF output signal having a second output power control range covering lower output power than the first output power control range.

Referring to FIG. 3B, the SC-DAC 160_2 may include a high-power DAC circuit 164a_2, a low-power DAC circuit 164b_2, and an output terminal 166_2. Compared to the low-power DAC circuit 164b_1 in FIG. 3A, the low-power DAC circuit 164b_2 may further include a second switch element SW2, and the opposite end T2 of the power attenuation capacitor C_PA may be selectively connected to the output end T_OUT2 of the second capacitor row $2^{nd}\_CC$ or the ground through the first and second switch elements SW1 and SW2.

In the low power output mode, the first switch element SW1 may be turned on and the second switch element SW2 may be turned off, and the low-power DAC circuit 164b_2 may operate in the same manner as the low-power DAC circuit 164b_1 in FIG. 3A. In the high power output mode, the first switch element SW1 may be turned off and the second switch element SW2 may be turned on so that the opposite end T2 of the power attenuation capacitor C_PA may be connected to the ground, instead of being floated as shown in FIG. 3A. Accordingly, in the high power output mode, the high-power DAC circuit 164a_2 may generate the first RF output signal more reliably.

The configurations of the SC-DACs 160_1 and 160_2 of FIGS. 3A and 3B are just some example embodiments. Example embodiments are not limited thereto and may include various configurations that selectively generate and output one of RF output signals, which have different output power control ranges.

Figure 4A:
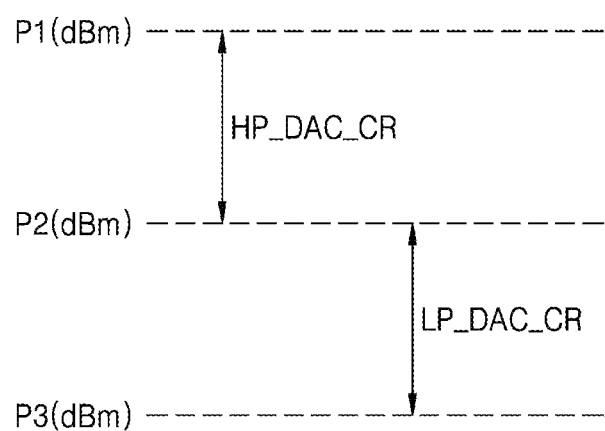
FIGS. 4A and 4B are diagrams for describing first output power control ranges of a high-power DAC circuit and second output power control ranges of a low-power DAC circuit, according to some example embodiments.
Figure 4B:
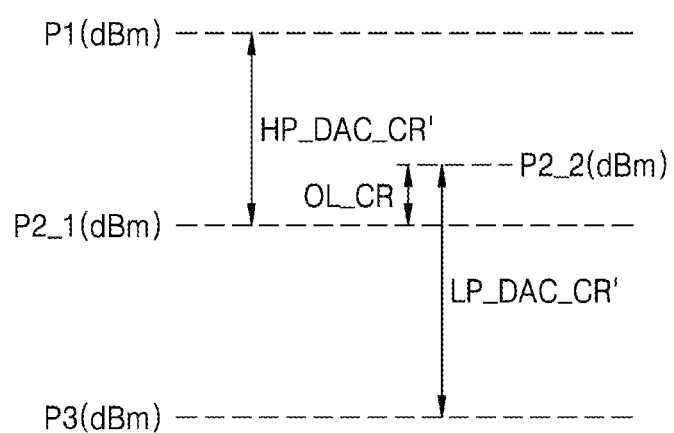

FIGS. 4A and 4B are diagrams for describing first output power control ranges HP_DAC_CR and HP_DAC_CR' of a high-power DAC circuit and second output power control ranges LP_DAC_CR and LP_DAC_CR' of a low-power DAC circuit, according to some example embodiments. For clear understanding, FIG. 3A will also be referred to in the descriptions below.

Referring to FIG. 4A, the high-power DAC circuit 164a_1 may generate a first RF output signal having the first output power control range HP_DAC_CR. The first RF output signal may have a first resolution corresponding to the first output power control range HP_DAC_CR. For example, the first output power control range HP_DAC_CR may satisfy an error vector magnitude (EVM) requirement and cover from first power P1 to second power P2, and power may be defined by decibels above 1 milliwatt (dBm). In an example embodiment, a capacitance of each of the first through n-th capacitors C1_1 through Cn_1 of the first capacitor row $1^{st}\_CC$ may be configured or predetermined so as to support the first output power control range HP_DAC_CR.

The low-power DAC circuit 164b_1 may generate a second RF output signal having the second output power control range LP_DAC_CR. The second RF output signal may have a second resolution corresponding to the second output power control range LP_DAC_CR. For example, the second output power control range LP_DAC_CR may satisfy the EVM requirement and cover from the second power P2 to third power P3. In an example embodiment, a capacitance of each of the first through m-th capacitors C1_2 through Cm_2 of the second capacitor row $2^{nd}\_CC$ and the power attenuation capacitor C_PA may be configured or predetermined so as to support the second output power control range LP_DAC_CR as the first through m-th capacitors C1_2 through Cm_2 and the power attenuation capacitor C_PA are connected in parallel to the first capacitor row $1^{st}$_CC.

In an example embodiment, the first output power control range HP_DAC_CR and the second output power control range LP_DAC_CR may not overlap each other.

Referring to FIG. 4B, the first output power control range HP_DAC_CR' may satisfy the EVM requirement and cover from the first power P1 to 2_1st power P2_1. In an example embodiment, the capacitance of each of the first through n-th capacitors C1_1 through Cn_1 of the first capacitor row $1^{st}$_CC may be configured or predetermined so as to support the first output power control range HP_DAC_CR'.

The second output power control range LP_DAC_CR' may satisfy the EVM requirement and cover from 2_2nd power P2_2 to the third power P3. In an example embodiment, the capacitance of each of the first through m-th capacitors C1_2 through Cm_2 of the second capacitor row $2^{nd}$_CC and the power attenuation capacitor C_PA may be configured or predetermined so as to support the second output power control range LP_DAC_CR' as the first through m-th capacitors C1_2 through Cm_2 and the power attenuation capacitor C_PA are connected in parallel to the first capacitor row $1^{st}$_CC.

In an example embodiment, each of the first output power control range HP_DAC_CR' and the second output power control range LP_DAC_CR' may include an overlapping range OL_CR from the 2_1st power P2_1 to the 2_2nd power P2_2. Because it is hard to realize matching among the first through n-th capacitors C1_1 through Cn_1 of the first capacitor row $1^{st}$_CC, the first through m-th capacitors C1_2 through Cm_2 of the second capacitor row $2^{nd}$_CC, and the power attenuation capacitor C_PA and degradation may occur due to factors such as process, voltage, and/or temperature (PVT), the overlapping range OL_CR in FIG. 4B may be desirable to ensure continuity of the output power of the SC-DAC 160_2.

Figure 5:
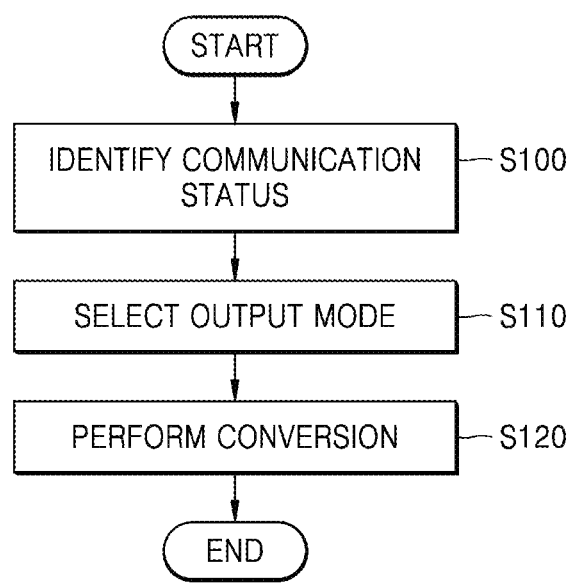
FIG. 5 is a flowchart of an operating method of a wireless communication device, according to an example embodiment.

FIG. 5 is a flowchart of an operating method of a wireless communication device, according to an example embodiment.

Referring to FIG. 5, the wireless communication device may identify the communication status between the wireless communication device and a base station (or another wireless communication device) in operation S100. As described above, the wireless communication device may measure at least one selected from RSRP, an RSRQ, an RSSI, and an SINR of a signal received from the base station to identify the communication status. For example, the wireless communication device may identify the communication status as being good when the RSRP is greater than or equal to a reference value and as being poor when the RSRP is less than the reference value.

The wireless communication device may select an output mode based on the communication status in operation S110. For example, the wireless communication device may select the high power output mode when the communication status is poor and the low power output mode when the communication status is good.

The wireless communication device may perform digital-to-analog conversion based on the selected output mode in operation S120. For example, when the high power output mode is selected, the wireless communication device may perform digital-to-analog conversion on a digital signal using a high-power DAC circuit and generate a first RF output signal having a first output power control range. When the low power output mode is selected, the wireless communication device may perform digital-to-analog conversion on a digital signal using a low-power DAC circuit and generate a second RF output signal having a second output power control range.

Figure 6:
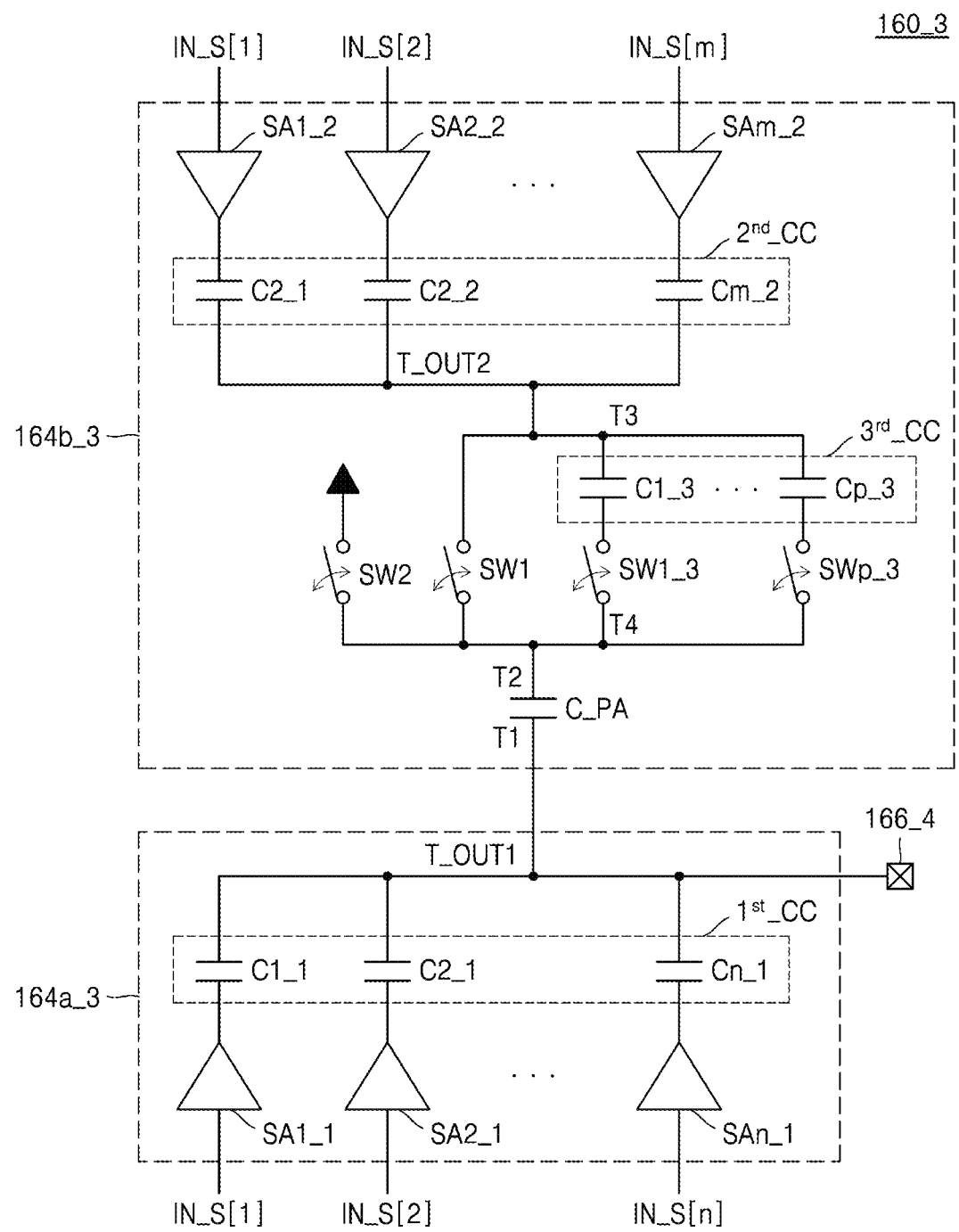
FIG. 6 is a circuit diagram of an SC-DAC according to an example embodiment.

FIG. 6 is a circuit diagram of an SC-DAC 160_3 according to an example embodiment.

Referring to FIG. 6, the SC-DAC 160_3 may include a high-power DAC circuit 164a_3, a low-power DAC circuit 164b_3, and an output terminal 166_4. Compared to the low-power DAC circuit 164b_2 in FIG. 3B, the low-power DAC circuit 164b_3 may further include 1_3rd through p_3rd switch elements SW1_3 through SWp_3 and a third capacitor row $3^{rd}$_CC. The third capacitor row $3^{rd}$_CC may include first through p-th capacitors C1_3 through Cp_3. The 1_3rd through p_3rd switch elements SW1_3 through SWp_3 and the third capacitor row $3^{rd}$_CC may be configured to adjust a second output power control range of the low-power DAC circuit 164b_3. In an example embodiment, the opposite end T2 of the power attenuation capacitor C_PA may be selectively connected to an end of the third capacitor row $3^{rd}$_CC, the ground, or the output end T_OUT2 of the second capacitor row $2^{nd}$_CC, and an opposite end of the third capacitor row $3^{rd}$_CC may be connected to the output end T_OUT2 of the second capacitor row $2^{nd}$_CC.

In the low power output mode, the low-power DAC circuit 164b_3 may adjust the second output power control range based on the communication status and generate a second RF output signal having an adjusted second output power control range. For example, in the low power output mode, the 1_3rd through p_3rd switch elements SW1_3 through SWp_3 of the low-power DAC circuit 164b_3 may be controlled such that one of the first through p-th capacitors C1_3 through Cp_3 of the third capacitor row $3^{rd}$ CC is connected in series to the power attenuation capacitor C_PA. Through this control, the second output power control range may be adjusted to cover output power lower than that covered when the opposite end T2 of the power attenuation capacitor C_PA is connected to the output end T_OUT2 of the second capacitor row $2^{nd}$_CC. In some example embodiments, some of the first through p-th capacitors C1_3 through Cp_3 may be connected to the power attenuation capacitor C_PA.

In an example embodiment, the first through p-th capacitors C1_3 through Cp_3 of the third capacitor row $3^{rd}$ CC may have different capacitances from each other, and as the capacitance of a capacitor, which is connected in series to the power attenuation capacitor C_PA through control on the 1_3rd through p_3rd switch elements SW1_3 through SWp_3, decreases, the low-power DAC circuit 164b_3 may generate the second RF output signal having the second output power control range that covers lower output power.

Figure 7A:
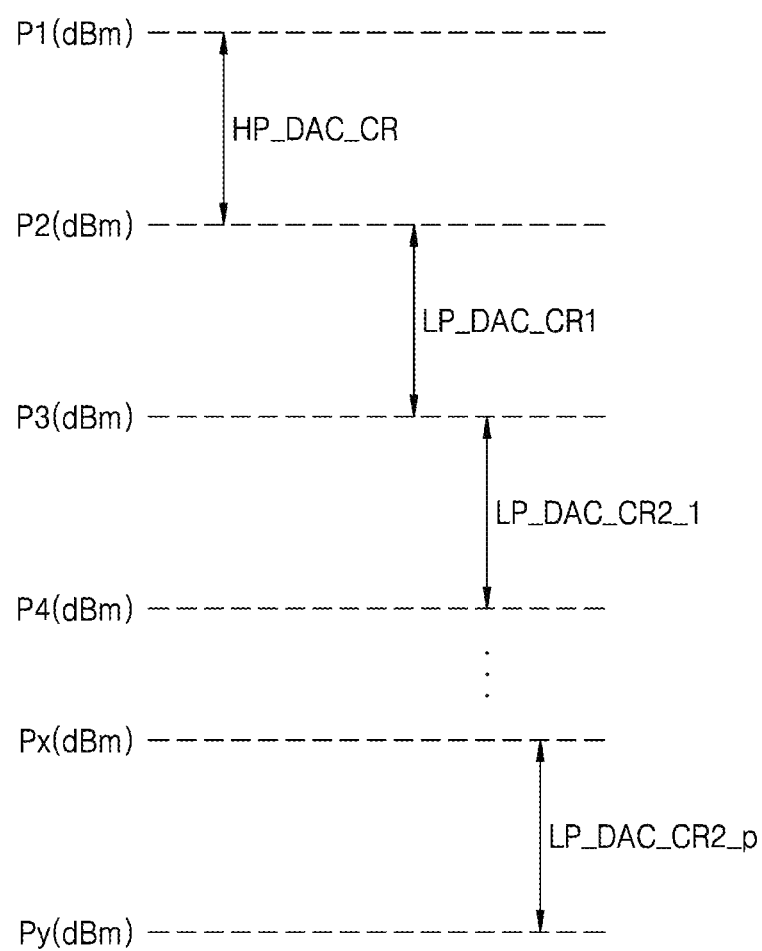
FIGS. 7A and 7B are diagrams for describing first output power control ranges of a high-power DAC circuit and second output power control ranges of a low-power DAC circuit, according to some example embodiments.
Figure 7B:
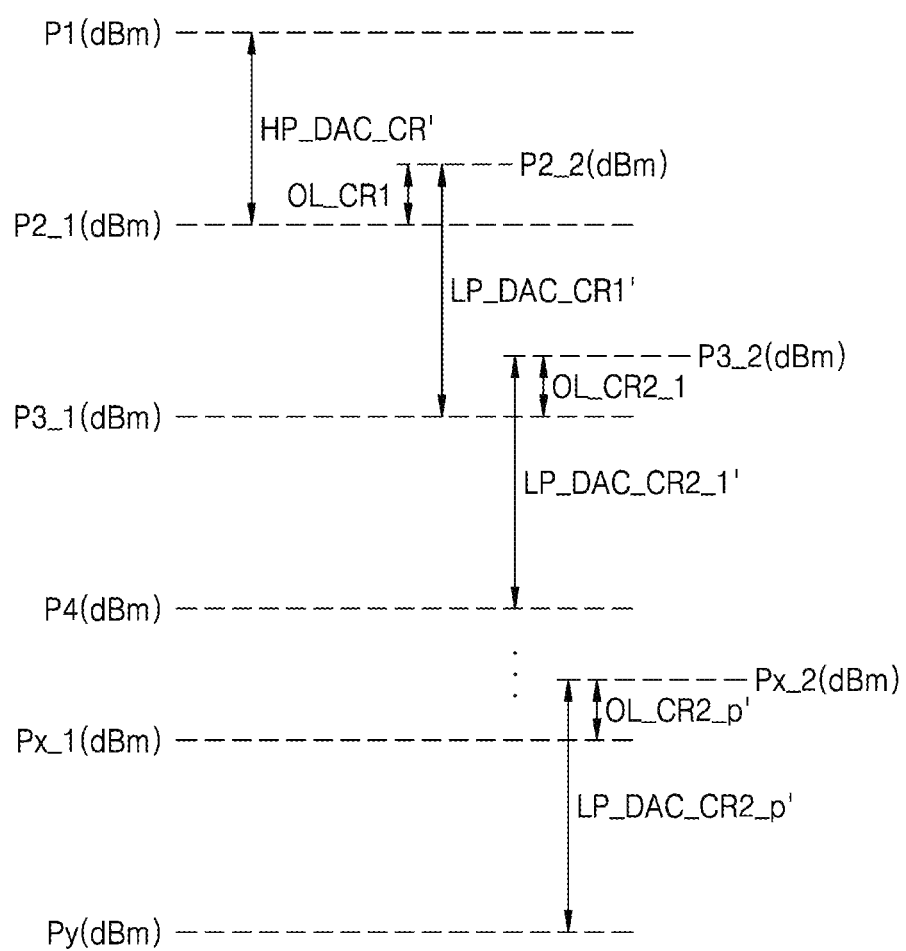

FIGS. 7A and 7B are diagrams for describing the first output power control ranges HP_DAC_CR and HP_DAC_CR' of a high-power DAC circuit and second output power control ranges LP_DAC_CR1, LP_DAC_CR2_1 through LP_DAC_CR2_p, LP_DAC_CR1', and LP_DAC_CR2_1' through LP_DAC_CR2_p' of a low-power DAC circuit, according to some example embodiments. For clear understanding, FIG. 6 will also be referred to in the descriptions below.

Referring to FIG. 7A, the high-power DAC circuit 164a_3 may generate a first RF output signal having the first output power control range HP_DAC_CR. For example, the first output power control range HP_DAC_CR may satisfy the EVM requirement and cover from the first power P1 to the second power P2. Because the high-power DAC circuit 164a_3 operates in the same manner as the high-power DAC circuit 164a_1 described with reference to FIG. 4A, detailed descriptions thereof will be omitted.

When the first switch element SW1 is turned on and the second switch element SW2 and the 1_3rd through p_3rd switch elements SW1_3 through SWp_3 are turned off in the low-power DAC circuit 164b_3, the low-power DAC circuit 164b_3 may generate the second RF output signal having the second output power control range LP_DAC_CR1. At this time, the second output power control range LP_DAC_CR1 may satisfy the EVM requirement and cover from the second power P2 to the third power P3.

When the 1_3rd switch element SW1_3 is turned on and the first and second switch elements SW1 and SW2 and the 2_3rd through p_3rd switch elements SW2_3 through SWp_3 are turned off in the low-power DAC circuit 164b_3, the first capacitor C1_3 of the third capacitor row $3^{rd}$_CC may be connected in series between the power attenuation capacitor C_PA and the second capacitor row $2^{nd}$_CC, and the low-power DAC circuit 164b_3 may generate the second RF output signal having the second output power control range LP_DAC_CR2_1. The second output power control range LP_DAC_CR2_1 may satisfy the EVM requirement and cover a lower range from the third power P3 to fourth power P4 than the second output power control range LP_DAC_CR1.

When the p_3rd switch element SWp_3 is turned on and the first and second switch elements SW1 and SW2 and the 2_3rd through (p-1) 3rd switch elements SW1_3 through SW (p-1)_3 are turned off in the low-power DAC circuit 164b_3, the p-th capacitor Cp_3 of the third capacitor row $3^{rd}$_CC may be connected in series between the power attenuation capacitor C_PA and the second capacitor row $2^{nd}$_CC, and the low-power DAC circuit 164b_3 may generate the second RF output signal having the second output power control range LP_DAC_CR2_p. The second output power control range LP_DAC_CR2_p may satisfy the EVM requirement and cover a lower range from x-th power Px to y-th power Py than the second output power control ranges LP_DAC_CR1 and LP_DAC_CR2_1 through LP_DAC_CR2 (p-1).

In an example embodiment, when a wireless communication device operates in the low power output mode, the wireless communication device may select one of the second output power control ranges LP_DAC_CR1 and LP_DAC_CR2_1 through LP_DAC_CR2_p based on the communication status and control the switching of the 1_3rd through p_3rd switch elements SW1_3 through SWp_3 to generate the second RF output signal having a selected second output power control range. For example, when a wireless communication device is determined to operate in the low power output mode and the communication status is best, the p-th capacitor Cp_3 of the third capacitor row $3^{rd}$_CC may be connected in series to the power attenuation capacitor C_PA, thereby supporting the second output power control range LP_DAC_CR2_p. When a wireless communication device is determined to operate in the low power output mode and the communication status is worst, the power attenuation capacitor C_PA may be directly connected to the output end T_OUT2 of the second capacitor row $2^{nd}$_CC, thereby supporting the second output power control range LP_DAC_CR1.

In an example embodiment, the sizes of the second output power control ranges LP_DAC_CR1 and LP_DAC_CR2_1 through LP_DAC_CR2_p may be the same as or different from one another, and may be determined by the capacitances of the power attenuation capacitor C_PA and the first through p-th capacitors C1_3 through Cp_3 of the third capacitor row $3^{rd}$_CC.

Referring to FIG. 7B, the first output power control range HP_DAC_CR' may cover from the first power P1 to the 2_1st power P2_1. The second output power control range LP_DAC_CR1' may cover from the 2_2nd power P2_2 to 3_1st power P3_1. The second output power control range LP_DAC_CR2_1' may cover from 3_2nd power P3_2 to the fourth power P4. The second output power control range LP_DAC_CR2_p' may cover from x_2nd power Px_2 to the y-th power Py.

The first output power control range HP_DAC_CR' and the second output power control range LP_DAC_CR' may include an overlapping range OL CR1 from the 2_1st power P2_1 to the 2_2nd power P2_2. The second output power control ranges LP_DAC_CR1' and LP_DAC_CR2_1' through LP_DAC_CR2_p' may include overlapping ranges OL_CR2_1 through OL_CR2_p' thereamong. This is for ensuring the continuity of output power, as described above with reference to FIG. 4B. As shown in FIG. 7B, the SC-DAC 160_3 may also ensure the continuity of output power in the low power output mode that selectively supports a plurality of second output power control ranges (e.g., the second output power control ranges LP_DAC_CR1' and LP_DAC_CR2_1' through LP_DAC_CR2_p').

Figure 8:
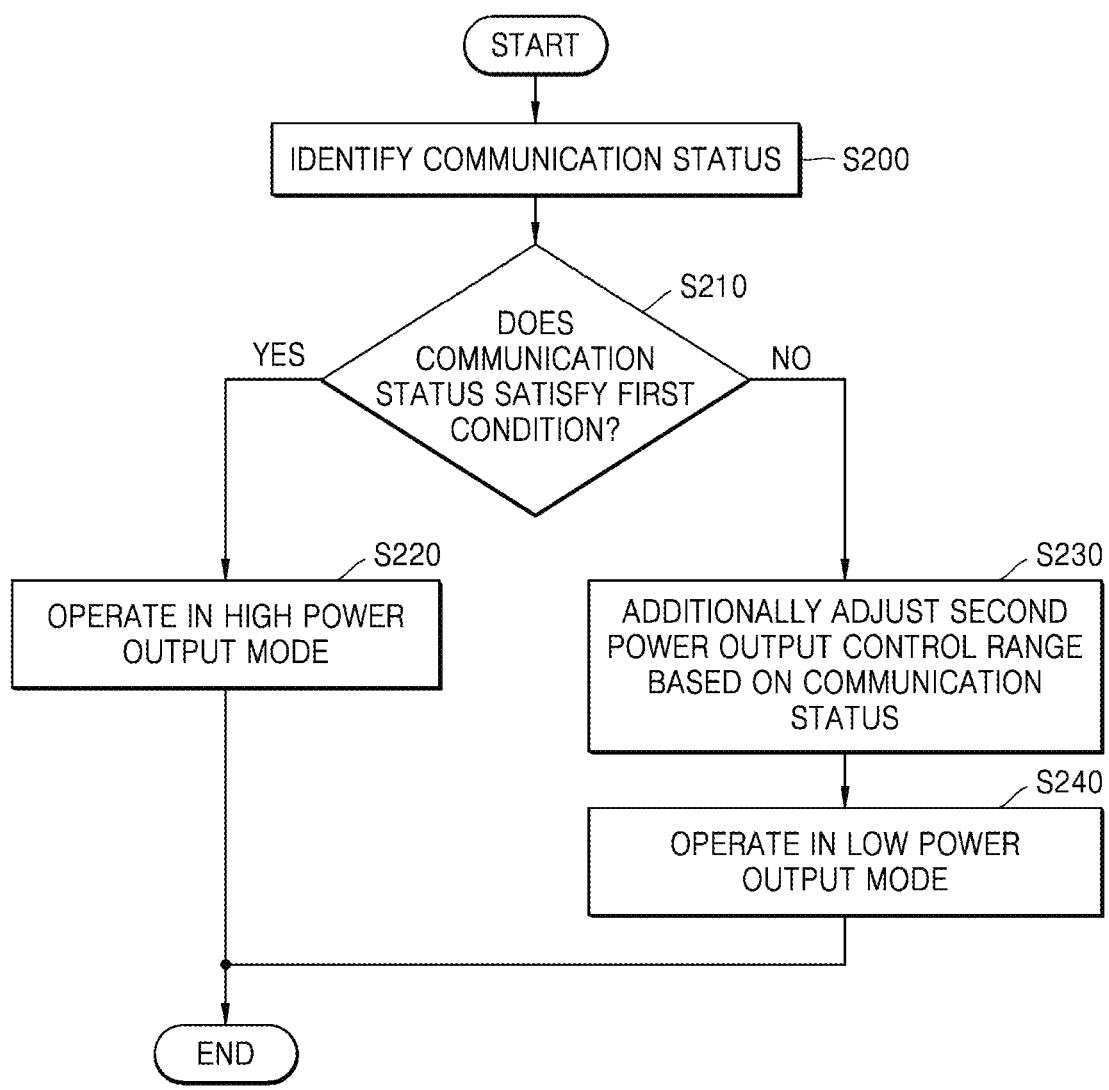
FIG. 8 is a flowchart of an operating method of a wireless communication device, according to an example embodiment.

FIG. 8 is a flowchart of an operating method of a wireless communication device, according to an example embodiment.

Referring to FIG. 8, the wireless communication device may identify the communication status between the wireless communication device and a base station (or another wireless communication device) in operation S200. The wireless communication device may determine whether the communication status satisfies a first condition in operation S210. The identified communication status may be represented by an index that is objectively compared, and operation S210 may be performed by comparing the index with the first condition. When the answer is "YES" in operation S210, the method may proceed to operation S220. The wireless communication device operates in a high power output mode in operation S220, and accordingly, a high-power DAC circuit may generate a first RF output signal having a first output power control range from a digital signal. Otherwise, when the answer is "NO" in operation S210, the method may proceed to operation S230. The wireless communication device may adjust a second output power control range based on the communication status in operation S230. The wireless communication device operates in a low power output mode in operation S240, and accordingly, a low-power DAC circuit may generate a second RF output signal having a second output power control range from a digital signal.

Figure 9:
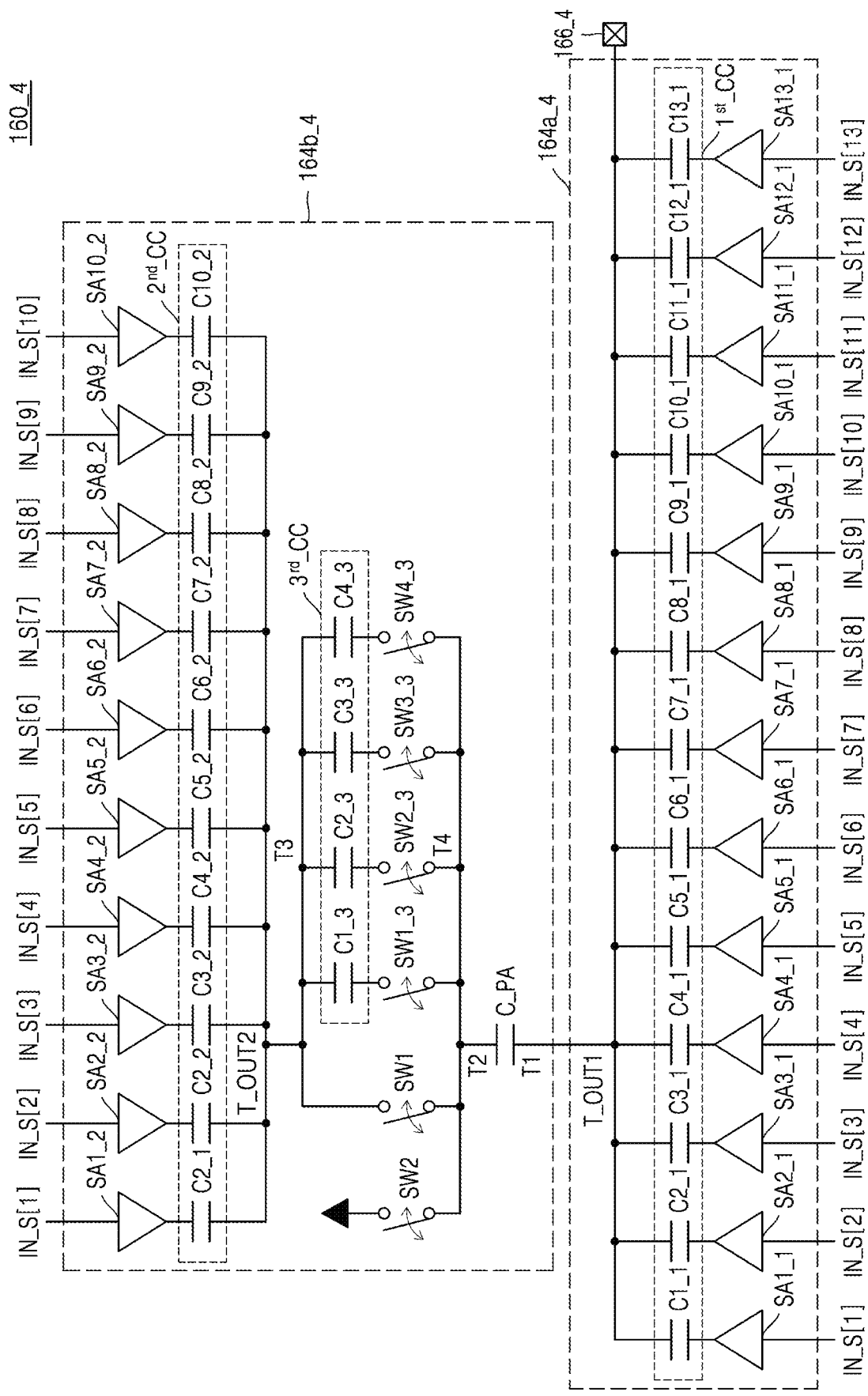
FIG. 9 is a circuit diagram of an SC-DAC according to an example embodiment.

FIG. 9 is a circuit diagram of an SC-DAC 160_4 according to an example embodiment. Redundant descriptions given above with reference to FIGS. 3A, 3B, and 6 will be omitted below.

Referring to FIG. 9, the SC-DAC 160_4 may include a high-power DAC circuit 164a_4, a low-power DAC circuit 164b_4, and an output terminal 166_4. The high-power DAC circuit 164a_4 may include first through 13th switching amplifiers SA1_1 through SA13_1 and the first capacitor row $1^{st}$_CC. The first capacitor row $1^{st}$_CC may include first through 13th capacitors C1_1 through C13_1 connected in parallel to one another. The first through 13th capacitors C1_1 through C13_1 may be configured to generate a first RF output signal having 13-bit resolution. The high-power DAC circuit $164a\_4$ may receive first through 13th input signals IN_S[1] through IN_S[13] and generate the first RF output signal, which has a first output power control range and 13-bit resolution.

The low-power DAC circuit $164b\_4$ may include first through tenth switching amplifiers SA1_2 through SA10_2, the second capacitor row $2^{nd}\_CC$, the third capacitor row $3^{rd}\_CC$, the power attenuation capacitor C_PA, the first and second switch elements SW1 and SW2, and 1_3rd through 4_3rd switch elements SW1_3 through SW4_3.

The second capacitor row $2^{nd}\_CC$ may include first through tenth capacitors C1_2 through C10_2 connected in parallel to one another. The first through tenth capacitors C1_2 through C10_2 may be configured to generate a second RF output signal having 10-bit resolution. The third capacitor row $3^{rd}\_CC$ may include first through fourth capacitors C1_3 through C4_3, which may be selectively connected to the power attenuation capacitor C_PA through the 1_3rd through 4_3rd switch elements SW1_3 through SW4_3, respectively. For example, as one of the first through fourth capacitors C1_3 through C4_3 of the third capacitor row $3^{rd}\_CC$ is connected in series to the power attenuation capacitor C_PA in the low power output mode, a second output power control range may be adjusted. Through this structure, the low-power DAC circuit $164b\_4$ may receive the first through tenth input signals IN_S[1] through IN_S[10] and generate the second RF output signal, which has one of five second output power control ranges and 10-bit resolution. In an example embodiment, the eleventh through 13th input signals IN_S[11] through IN_S[13] among the first through 13th input signals IN_S[1] through IN_S[13] may correspond to least significant bits (LSBs). In some example embodiments, the low-power DAC circuit $164b\_4$ may be configured to receive some of the first through 13th input signals IN_S[1] through IN_S[13], in which the number of LSBs is greater or smaller that the number of the LSBs in FIG. 9.

Figure 10:
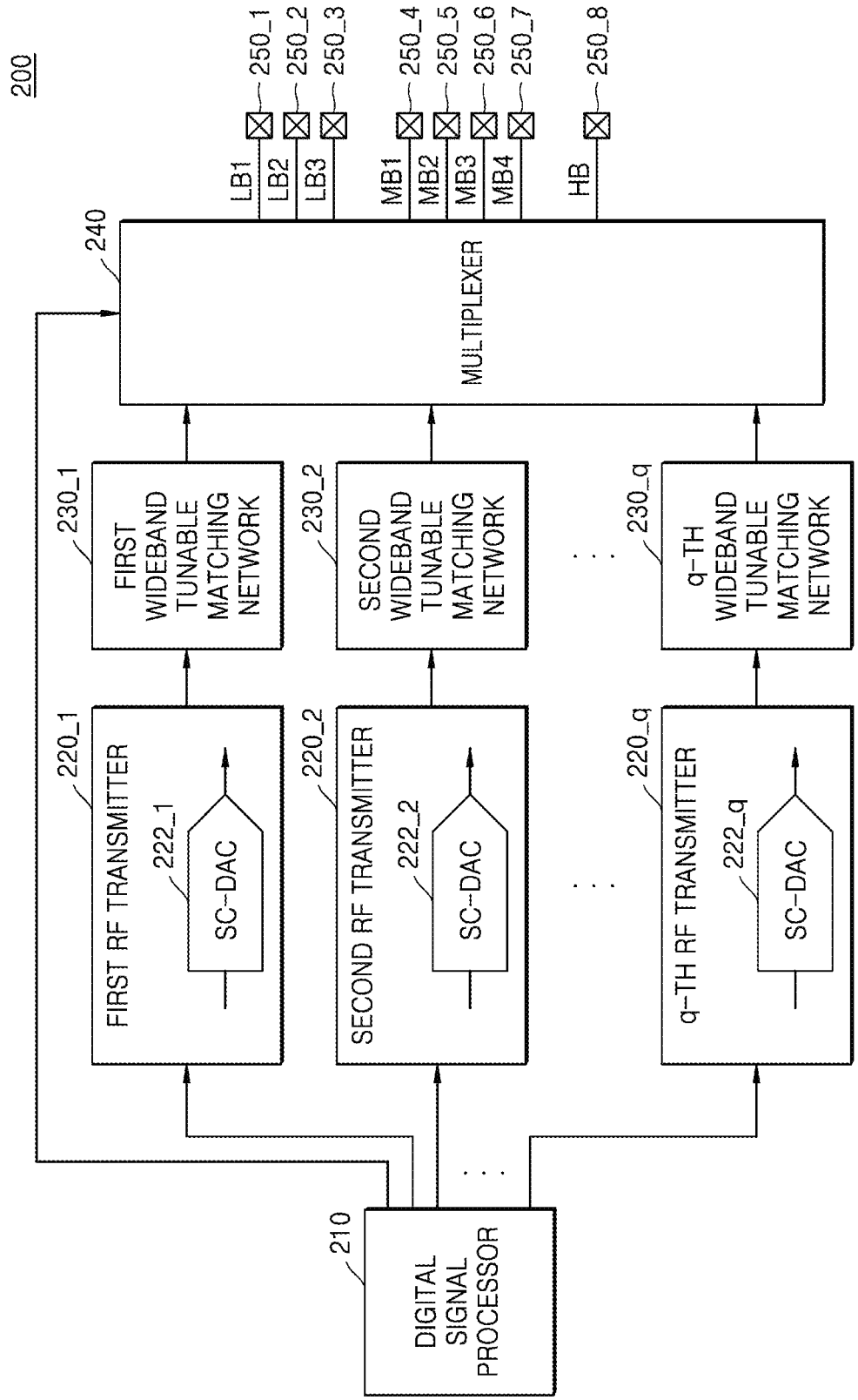
FIG. 10 is a block diagram of a wireless communication device according to an example embodiment.

FIG. 10 is a block diagram of a wireless communication device 200 according to an example embodiment.

Referring to FIG. 10, the wireless communication device 200 may include a digital signal processor 210, first through q-th RF transmitters 220_1 through 220_q, first through q-th wideband tunable matching networks 230_1 through 230_q, a multiplexer 240, and a plurality of output terminals (e.g., first through eighth output terminals 250_1 through 250_8). The example embodiments described above with reference to FIGS. 1 through 11 may be applied to respective SC-DACs 222_1 through 222_q of the first through q-th RF transmitters 220_1 through 220_q. Each of the first through q-th wideband tunable matching networks 230_1 through 230_q may include a balun (not shown) and a power amplifier (not shown), which are suitable for a corresponding one of the first through q-th RF transmitters 220_1 through 220_q connected to the first through q-th wideband tunable matching networks 230_1 through 230_q, respectively. Among the first through eighth output terminals 250_1 through 250_8, the first through third output terminals 250_1 through 250_3 may correspond to first through third low bands LB1 through LB3, respectively, the fourth through seventh output terminals 250_4 through 250_7 may correspond to first through fourth midbands MB1 through MB4, respectively, and the eighth output terminal 250_8 may correspond to a high band HB. However, the configuration of the wireless communication device 200 of FIG. 10 is just an example embodiment, and example embodiments are not limited thereto. A wireless communication device may be implemented to support communications in various frequency bands.

When operating in a time division duplex mode, the digital signal processor 210 may select one of the first through q-th RF transmitters 220_1 through 220_q and provide a baseband digital signal to the selected RF transmitter. The selected RF transmitter may generate an RF output signal by performing frequency up-conversion and digital-to-analog conversion on the baseband digital signal and output the RF output signal to a wideband tunable matching network connected thereto. The wideband tunable matching network may generate an RF analog signal using the received RF output signal and output, through the multiplexer 240, the RF analog signal to an output terminal corresponding to the frequency band of the RF analog signal among the first through eighth output terminals 250_1 through 250_8. The digital signal processor 210 may control a switching operation of the multiplexer 240.

When operating in a frequency division duplex mode, the digital signal processor 210 may select a plurality of RF transmitters from the first through q-th RF transmitters 220_1 through 220_q and provide a digital signal to each of the selected RF transmitters. The selected RF transmitters may operate in parallel and may respectively generate and output RF output signals to wideband tunable matching networks respectively connected thereto. Each of the wideband tunable matching networks may generate and output an RF analog signal through the multiplexer 240 to an output terminal corresponding to the frequency band of the RF analog signal among the first through eighth output terminals 250_1 through 250_8. Consequently, the wireless communication device 200 may perform RF analog signal transmission using a plurality of frequency bands simultaneously.

Figure 11:
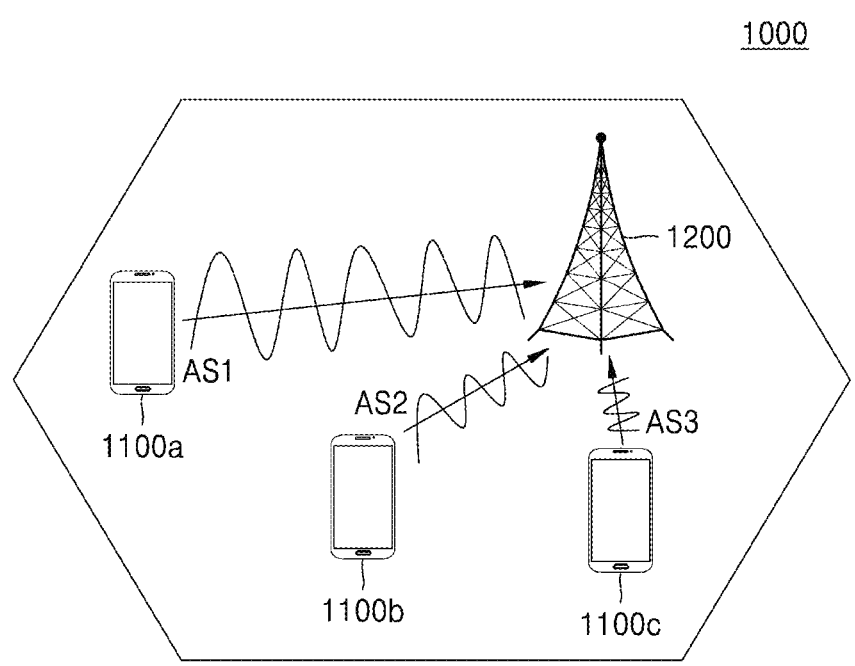
FIG. 11 is a block diagram of a wireless communication system according to an example embodiment.

FIG. 11 is a block diagram of a wireless communication system 1000 according to an example embodiment.

Referring to FIG. 11, the wireless communication system 1000 may include first through third wireless communication devices 1100a, 1100b, and 1100c and a base station 1200. The example embodiments described above with reference to FIGS. 1 through 10 may be applied to the first through third wireless communication devices 1100a through 1100c. The first wireless communication device 1100a is farthest away from the base station_1200 and may thus be in a communication status that does not satisfy the first condition in FIG. 8, and accordingly, the first wireless communication device 1100a may operate in the high power output mode. The first wireless communication device 1100a may generate a first RF output signal having a first output power control range using a high-power DAC circuit, amplify the first RF output signal, and output an amplification result as a first RF analog signal AS1 to the base station 1200.

The second wireless communication device 1100b is closer to the base station 1200 than the first wireless communication device 1100a and may be in a communication status that satisfies the first condition in FIG. 8. The second wireless communication device 1100b may generate a second RF output signal having a second output power control range using a low-power DAC circuit, amplify the second RF output signal, and output an amplification result as a second RF analog signal AS2 to the base station_1200. The second output power control range of the second wireless communication device 1100b may cover lower output power than the first output power control range of the first wireless communication device 1100a.

The third wireless communication device 1100c is closer to the base station_1200 than the second wireless communication device 1100b and may be in a better communication status than the second wireless communication device 1100b. The third wireless communication device 1100c may generate a second RF output signal having a second output power control range, which covers lower power than the second output power control range of the second wireless communication device 1100b, using a low-power DAC circuit, amplify the second RF output signal, and output an amplification result as a third RF analog signal AS3 to the base station_1200.

While the inventive concepts have been particularly shown and described with reference to some example embodiments thereof, it will be understood that various changes in form and details may be made therein without departing from the spirit and scope of the following claims.

What is claimed is:

1. A radio frequency (RF) transmitter comprising:
a switched-capacitor digital-to-analog converter (SC-DAC) configured to selectively generate one of a first RF output signal and a second RF output signal from input signals received through a plurality of lines, the first RF output signal having a first output power control range and the second RF output signal having a second output power control range; and
an output terminal configured to output one of the first RF output signal and the second RF output signal,
wherein the SC-DAC includes,
a first capacitor row having an output end connected to the output terminal, the first capacitor row configured to generate the first RF output signal,
a power attenuation capacitor having an end connected to the output terminal,
a first switch element, and
a second capacitor row having an output end selectively connected to an opposite end of the power attenuation capacitor through the first switch element, the second capacitor row configured to generate the second RF output signal.

2. The RF transmitter of claim 1, wherein a number of first capacitors included in the first capacitor row is greater than a number of second capacitors included in the second capacitor row.

3. The RF transmitter of claim 2, wherein
the first capacitors are respectively connected to the plurality of lines, and
the second capacitors are respectively connected to some of the plurality of lines.

4. The RF transmitter of claim 1, wherein
the SC-DAC further includes a second switch element, and
the opposite end of the power attenuation capacitor is selectively connected to a ground through the second switch element.

5. The RF transmitter of claim 1, wherein the first output power control range covers higher output power than the second output power control range.

6. The RF transmitter of claim 5, wherein the first output power control range partially overlaps the second output power control range.

7. The RF transmitter of claim 1, wherein the SC-DAC further includes:
a plurality of third switch elements; and
a third capacitor row connected to the plurality of third switch elements and configured to adjust the second output power control range,
the opposite end of the power attenuation capacitor is selectively connected to an end of the third capacitor row through the plurality of third switch elements, and
an opposite end of the third capacitor row is connected to the output end of the second capacitor row.

8. The RF transmitter of claim 7, wherein the third capacitor row includes a plurality of capacitors connected to the plurality of third switch elements, respectively, and the plurality of capacitors have different capacitances from each other.

9. The RF transmitter of claim 8, wherein the plurality of third switch elements are configured to selectively connect in series at least one of the plurality of capacitors to the opposite end of the power attenuation capacitor.

10. The RF transmitter of claim 7, wherein
the SC-DAC is configured to selectively generate a plurality of second RF output signals having a plurality of second output power control ranges using the plurality of third switch elements and the third capacitor row, the plurality of second RF output signals including the second RF output signal having the second output power control range, and
at least one of the plurality of second output power control ranges adjusted by the third capacitor row partially overlap another one of the plurality of second output power control ranges.

11. A wireless communication device comprising:
a modem configured to output digital signals by modulating digital data; and
a radio frequency (RF) transmitter configured to selectively generate, from a plurality of input signals corresponding to the digital signals, and output one of a first RF output signal and a second RF output signal based on a communication status, the first RF output signal having a first output power control range and the second RF output signal having a second output power control range,
wherein the RF transmitter includes,
a high-power switched-capacitor digital-to-analog converter (SC-DAC) circuit including a first capacitor row configured to generate the first RF output signal having the first output power control range when receiving the plurality of input signals, and
a low-power SC-DAC circuit including a second capacitor row configured to generate the second RF output signal having the second output power control range when receiving some of the plurality of input signals.

12. The wireless communication device of claim 11, wherein the low-power SC-DAC circuit further includes a power attenuation capacitor having an end connected to an output end of the first capacitor row and an opposite end selectively connected to an output end of the second capacitor row or a ground.

13. The wireless communication device of claim 12, wherein
the low-power SC-DAC circuit further includes a third capacitor row connected to a plurality of switch elements and configured to adjust the second output power control range, and
an end of the third capacitor row is selectively connected to the opposite end of the power attenuation capacitor through the plurality of switch elements, and an opposite end of the third capacitor row is connected to the output end of the second capacitor row.

14. The wireless communication device of claim 13, wherein the modem is configured to determine an output mode based on the communication status and provide a control signal to the high-power SC-DAC circuit and the low-power SC-DAC circuit, the control signal corresponding to a determined output mode.

15. The wireless communication device of claim 14, wherein when the determined output mode is a high power output mode, the opposite end of the power attenuation capacitor is connected to the ground, and the high-power SC-DAC circuit is configured to receive the plurality of input signals and to generate the first RF output signal, in response to the control signal.

16. The wireless communication device of claim 14, wherein when the determined output mode is a low power output mode, the opposite end of the power attenuation capacitor is connected to the output end of the second capacitor row or connected in series to at least one capacitor included in the third capacitor row, and the low-power SC-DAC circuit is configured to receive some of the plurality of input signals and to generate the second RF output signal, in response to the control signal.

17. The wireless communication device of claim 16, wherein in the low power output mode, the second output power control range covers higher output power when the opposite end of the power attenuation capacitor is connected to the output end of the second capacitor row than an output power covered by the second output power control range when the opposite end of the power attenuation capacitor is connected in series to a first capacitor included in the third capacitor row.

18. The wireless communication device of claim 17, wherein in the low power output mode, the second output power control range covers higher output power when the opposite end of the power attenuation capacitor is connected in series to the first capacitor included in the third capacitor row than output power covered by the second output power control range when the opposite end of the power attenuation capacitor is connected in series to a second capacitor included in the third capacitor row.

19. The wireless communication device of claim 14, wherein the modem is further configured to measure at least one selected from reference signal received power (RSRP), a reference signal received quality (RSRQ), a received signal strength indicator (RSSI), and a signal-to-interference noise ratio (SINR) of a signal received from a base station and to identify the communication status.

20. A radio frequency (RF) transmitter comprising:
a high-power switched-capacitor digital-to-analog converter (SC-DAC) circuit including a first capacitor row including "n" capacitors, the first capacitor row configured to receive "n" input signals through "n" lines and generate a first RF output signal from the "n" input signals, the first RF output signal having a first output power control range, where "n" is an integer of at least 1;
a low-power SC-DAC circuit including a second capacitor row and a power attenuation capacitor, the second capacitor row including "m" capacitors and being configured to receive "m" input signals through "m" lines and generate a second RF output signal from the "m" input signals, the second RF output signal having a second output power control range, and the power attenuation capacitor being configured to be selectively connected to an output end of the second capacitor row, where "m" is an integer that is greater than or equal to 1 and less than "n"; and
a switch circuit configured to selectively input the "n" input signals to the high-power SC-DAC circuit or the "m" input signals to the low-power SC-DAC circuit based on a control signal corresponding to a communication status.

* * * * *